United States Patent Office 3,827,950
Patented Aug. 6, 1974

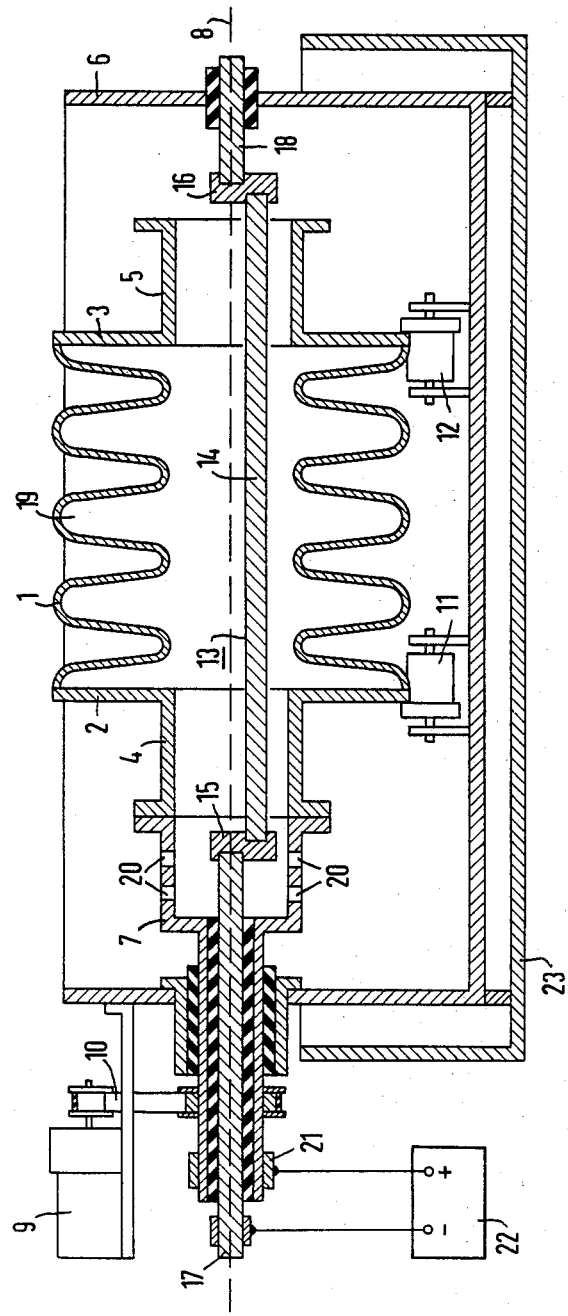

3,827,950
METHOD FOR ANODIC OXIDATION OF THE INTERIOR SURFACE OF A HOLLOW NIOBIUM BODY PROVIDED WITH AT LEAST ONE OPENING
Heinrich Diepers, Erlangen-Bruck, and Otto Schmidt and Reinhard Kress, Erlangen, Germany, assignors to Siemens Aktiengesellschaft, Munich, Germany
Filed Sept. 15, 1972, Ser. No. 289,547
Claims priority, application Germany, Sept. 18, 1971, P 21 46 785.6
Int. Cl. C23b 5/56, 5/78
U.S. Cl. 204—26
9 Claims

ABSTRACT OF THE DISCLOSURE

The invention relates to a method for the anodic oxidation of the interior surface of a hollow niobium body provided with at least one opening. In order to avoid the usually occurring disturbing effects of the gases produced at the cathode during the polishing of the niobium layer, the hollow niobium body, according to the invention, is immersed only partially in the electrolyte and is arranged rotatably about an axis extending through the opening in such a manner that in any position of the niobium body a vapor space exists which is connected with the external environment through the opening between the electrolyte level and all parts of the interior surface of the niobium body situated above the electrolyte level, and that, as the niobium body rotates, the individual parts of its interior surface are successively immersed in the electrolyte, but no part of the interior surface remains continually in the electrolyte.

The cathode is introduced into the hollow niobium body through the opening and is disposed in the electrolyte in such a manner that the portion of the electrolyte through which gases formed at the cathode, during the passage of current, rise to the surface of the electrolyte, is remote from the immersed portions of the interior surface of the hollow niobium body.

During the oxidation process the hollow niobium body is continuously rotated about the axis of rotation. The anodic oxidation of the surfaces of hollow niobium bodies by the present process improves the properties thereof. The process is particularly adapted for use in polishing cavity resonators, particle separators and cable sleeves.

SUMMARY OF THE INVENTION

The invention relates to a method for the anodic oxidation of the interior surface of a hollow niobium body provided with at least one opening by means of an electrolyte bath and an electric voltage applied between a cathode and the hollow niobium body connected as the anode.

As is well known, niobium is extraordinarily well suited as a superconductor for A-C applications. Hollow niobium bodies can, for instance, be used for superconducting high-frequency resonators or separators for particle accelerators, or in tubular form as conductors for particle accelerators, or in tubular form as conductors for superconducting cables. When niobium is used as an A-C superconductor, the physical condition of the surface is of critical importance, as electromagnetic alternating fields penetrate only about 400 A. deep into the superconductor. A rough uneven surface can degrade the properties of the superconductor considerably, and can, for instance, lead to high absorption losses. The surface properties of superconductive niobium cavity resonators may now be improved substantially by applying to the niobium surface an oxide layer by means of anodic oxidation (*Physics Letters, 34 A*, p. *439* to *440* (*1971*)). The application of the oxide layer may be preceded here optionally by chemical or electrochemical polishing. It was possible to achieve by means of the oxide layer, with thicknesses of the order of 0.1 $\mu$m., a considerable increase in the quality and the critical magnetic field in the niobium cavity resonators. Moreover such oxide layers act as protective layers and thereby prevent aging of the niobium surface. An aqueous ammonia solution has been found to be a particularly advantageous bath. In addition to niobium resonators, considerable advantages regarding a reduction of high-frequency and/or A-C losses, respectively, can also be expected by an anodically applied oxide layer with other niobium components, particularly in particle separators and in niobium tubes for superconducting cables.

While smaller parts of niobium, particularly of geometrically simple form, can be anodically oxidized without particular difficulty, it has been found, however, that considerable difficulty can be encountered in anodically oxidizing the interior surfaces of hollow niobium bodies. For instance, if one introduces a cathode through an opening in the hollow niobium body into the interior thereof connected as an anode in order to anodically oxidize the interior surface of a hollow niobium body, the gas development occurring at the cathode during the anodic oxidation can have very disturbing effects. First, there is the danger, particularly with hollow niobium bodies of complex geometrical structure, e.g., in hollow niobium bodies which are to be used as separators in particle accelerators, that gas pockets form in the interior of the hollow niobium bodies, so that parts of the interior surface to be oxidized are no longer wetted at all by the electrolyte and therefore are not anodically oxidized. One can, of course, make provision under certain circumstances, if the geometrical shape of the hollow niobium body is sufficiently simple, through an appropriate disposition of the hollow niobium body and the cathode in the electrolyte that the gas bubbles formed at the cathode can rise to the surface of the electrolyte without forming gas pockets.

In the case of a tubular hollow niobium body open on one or both sides, one can, for instance, arrange a rod-shaped cathode in the body axis and immerse the hollow niobium body with one opening upward from the electrolyte in such a way that the body axis and the cathode are perpendicular to the surface of the electrolyte.

Even through such an arrangement, however, the difficulties arising by reason of the gas development cannot be prevented reliably. Particularly in hollow niobium bodies, in which the length is large in comparison with the smallest inside interior dimension, practically the entire space between the inside surface of the hollow niobium body and the cathode is traversed by gas bubbles rising in the electrolyte if the cathode is correspondingly long. The gas bubbles travel directly along the interior surface of the hollow body and come in contact with it. In this process, the gas bubbles may get hung up for shorter or longer periods of time at the interior surface of the hollow niobium body. The development of the desired oxide layer is thereby considerably disturbed. Through such disturbances, however, the advantageous effects of oxide layers on niobium surfaces with respect to the electric properties and the superconducting properties are critically impaired.

It is an object of the invention to avoid the difficulties mentioned in the anodic oxidation of the interior surface of hollow niobium bodies and to make possible in particular the formation of homogeneous, largely undisturbed niobium oxide layers.

According to the invention, this problem is solved by immersing the hollow niobium body into the electrolyte only partially and by arranging it rotatably about an axis or rotation extending through its opening in such a manner that between the electrolyte level and all parts of the interior surface of the hollow niobium body which are situated above the surface of the electrolyte, there remains in any position of the hollow niobium body an adjacent vapor space communicating through the opening with the exterior environment. The individual parts of the interior surface of the body are successively immersed into the electrolyte as the hollow body revolves, but that no part of the interior surface remains continuously in the electrolyte. The cathode is introduced into the hollow niobium body through the opening and is arranged in the electrolyte relative to the hollow niobium body in such a way that the portion of the electrolyte through which the gases formed at the cathode through the passage of the current rise to the surface of the electrolyte, is free of the immersed parts of the interior surface of the hollow niobium body. The hollow niobium body is rotated continually about the axis of rotation during the oxidation process.

By means of the steps in accordance with the invention, the prior difficulties arising due to the gas development at the cathode are practically completely avoided. As the area of the electrolyte, in which the gases formed by the passage of the current rise to the surface of the electrolyte, is free of parts of the interior surface of the hollow niobium body, no gas bubbles can accumulate at those parts of the interior surface which are at the time in the electrolyte and are being anodically oxidized.

The development of a homogeneous oxide layer is therefore not impeded. As there is furthermore always a vapor space between the electrolyte surface and all parts of the interior surface of the hollow niobium body disposed above said surface and this vapor space is in communication with the exterior environment through said opening, the gas arising from the electrolyte into the vapor space can leave the hollow niobium body unimpeded, so that no gas pockets or occlusions can form.

As the hollow niobium body is rotated, all parts of its interior surface are immersed successively in the electrolyte and can be anodically oxidized. Since no part of the interior surface remains in the electrolyte continuously aniodic oxidation of certain portions of said interior surface regardless of the position of the hollow body is avoided and disturbing steps or other inhomogeneities relative to adjacent parts of the surface are prevented.

Through the continuous rotation of the hollow niobium body during the oxidation process the boundary surface between the electrolyte and the air shifts continuously along the interior surface of the hollow niobium body and the formation of steps due to extended dwelling of the boundary surface at a given place is avoided. For clarification it should be mentioned that the axis of rotation need not be a physical part of the structure of the body, but is understood to be the straight line, about which the niobium body can rotate.

It is particularly advantageous if this axis of rotation lies in the plane of the electrolyte surface and the hollow niobium body is rotated about the axis of rotation with constant angular velocity. In this way it is easily assured that all parts of the interior surface of the hollow niobium body are immersed for the same length of time in the electrolyte. In the anodic oxidation of hollow niobium bodies that are symmetrical about an axis the ocnditions become particularly simple if the axis of rotation coincides with the axis of symmetry.

The figure shows schematically in longitudinal cross section one embodiment of an apparatus for carrying out the method according to the invention.

DETAILED DESCRIPTION

Referring to the drawing, hollow niobium body 1, the interior surface of which is to be anodically oxidized, is of a relatively complex geometrical shape as shown. In this specific case, it is a separator structure for particle accelerators of the type $HEM_{011}$. On both sides hollow niobium body 1 is provided with flanged niobium covers 2 and 3 including tubular extensions 4 and 5 respectively.

The hollow niobium body 1 is disposed in an electrolyte tank 6. Hollow niobium body 1 is rotatably supported in said tank by tubular flange 7 which is connected with the tubular extension 4, for instance by bolts. Flange 7 is electrically insulated from said tank and extends in an electrolyte-tight manner through the side wall of the electrolyte tank 6 and is journalled therein about axis of rotation 8 as shown. In the embodiment shown in the figure, this axis of rotation coincides with the axis of symmetry for the symmetrical hollow niobium body 1.

Tubular flange 7 and hollow niobium body 1 interconnected therewith, can be rotated about axis 8 by means of motor 9 and associated drive belt 10 mounted on the electrolyte tank. Plastic rollers 11 and 12 mounted on the bottom of tank 6 provide additional support for hollow niobium body 1. These rollers can, of course, also be omitted if one provides a similar tubular flange corresponding to the flange 7 for supporting tubular extension 5 at the other end of the body 1.

For ease of installation cathode 13 can be disassembled and is comprised of several rod-shaped parts. The main part 14, which is situated in the interior of the hollow niobium body 1, is slightly offset downward as viewed in the figure from axis of rotation 8 so that it will be completely immersed in the electrolyte if the electrolyte level coincides with the axis of rotation 8. Said main part 14 is connected via connection pieces 15 and 16 with extensions 17 and 18, which are electrically insulated respectively against flange 7 and electrolyte tank 6 and are brought in an electrolyte-tight manner through the walls of electrolyte tank 6. The cathode assembly is stationary and does not rotate when flange 7 is rotated.

In operation electrolyte tank 6 is filled with electrolyte to about the axis of rotation 8. As will be seen from the figure, any gases generated at cathode 13, the main part 14 of which is disposed just below the surface of the electrolyte, can rise into the vapor space 19 above the surface of the electrolyte without contacting portions of the interior surface of hollow niobium body 1 that are immersed in the electrolyte. The wall of the flange 7 is provided at the end adjoining the hollow niobium body with holes 20 around its entire circumference. The gases that collect in the vapor space 19 can discharge unimpeded to the outside through the holes 20 of the flange that are disposed above the electrolyte surface as well as through the open tubular extension 5.

Flange 7 serves simultaneously as the electrical connection for hollow niobium body 1 which is connected as the anode. To this end flange 7 is connected via slip rings 21 with the positive terminal of a current source 22. Electrolyte tank 6 stands in tray 23 which may be supplied optionally with a liquid bath for controlling the electrolyte temperature. Tank 6, tubular flange 7, cathode 13, as well as all metal parts of the device coming into contact with the electrolyte, are preferably constructed of high-purity aluminum if an ammonia electrolyte is used. Polyethylene is for example suitable for rollers 11 and 12 and the insulating plastic parts at the extensions of cathode 13 and flange 7 through the walls of the tank 6. Retaining rings for example of a suitable rubber may be used as seals (not shown).

The method according to the present invention will be illustrated further by an example of a specific embodiment. Niobium separator 1, with respective covers 2 and 3 and tubular extensions 4 and 5, the interior of which is to be anodically oxidized, has for example a maximum inside diameter of about 130 mm. and at the narrowest points, respectively, a minimum inside diameter of about 40 mm. The length of the niobium separator including the tubular extensions 4 and 5 is about 300 mm. For the anodic oxidation, niobium separator 1 is first placed in the tank 6, as is shown in detail in the figure. The tank is then filled with the electrolyte until the electrolyte level reaches the axis of rotation 8. As the electrolyte is advantageously used an aqueous solution with 20 to 30% by weight, and preferably 25% by weight, of ammonia. The total volume of the electrolyte in the device is about 5 liters. The electrolyte is at room temperature. During the oxidation process hollow niobium body 1 is rotated by means of motor 9 at a speed of rotation of about one revolution per minute about axis of rotation 8. In order to avoid at the beginning of the oxidation process excessively high currents between the anode and the cathode, which could disturb the uniform structure of the oxide layer, one preferably does not immediately apply the full final voltage of, for instance, 100 v. D-C between the anode and the cathode, but increases the voltage gradually, beginning with a voltage of 0 volts, giving attention to the fact that a current density of about 2 ma./cm.$^2$ should not be exceeded. After the gradual increase of the voltage, the final voltage of about 100 v. is reached, one continues to oxidize until the current has decreased to a final current density of about 0.2 ma./cm.$^2$. This condition is reached after about 10 minutes. During the oxidation process the hollow niobium body has therefore been rotated about 10 full revolutions. The homogeneous oxide layer produced thereby has a thickness of about 0.28 $\mu$m.

The conditions under which the anodic oxidation takes place can of course, also be varied from the values given as an example. For instance, one can also increase the voltage in steps instead of gradually. Other electrolytes, for instance, sulfuric acid, can also be used. It is advisable to match the speed of rotation of the hollow niobium body that is to be oxidized on its inside surface to the growth velocity of the oxide layer. If the oxide layer grows slowly, the speed of rotation may be slow, if the oxide layer grows fast, the speed of rotation should be increased.

It is recommended to polish the interior surface of the hollow niobium body to be oxidized chemically or electrolytically prior to the anodic oxidation.

Also relatively long hollow niobium bodies, for instance niobium tubes several meters long for superconducting cables, can be anodically oxidized on their inside by means of the method according to the invention. It is only necessary to make the device shown in the figure sufficiently long, so that the niobium tube fits into the electrolyte tank 6. There is nothing to prevent coating the outside of the hollow niobium body whose inside is to be anodically oxidized with another metal which is attacked by the electrolyte, by the method according to the invention, if the other metal is covered up by a sheath resistant to the electrolyte, for instance, of a suitable plastic. This is particularly important in such niobium tubes for superconducting cables which carry a copper layer on their outside. During the anodic oxidation of such niobium tubes the outer copper coating can be protected against attack by the electrolyte by pulling, for instance, tubing of a suitable plastic over the tube. The same applies, of course, if the hollow niobium body which is to be anodically oxidized on its inside is a niobium layer which is applied to the inner wall of a copper tube.

We claim:

1. A method for the anodic oxidation of the interior surface of a hollow niobium structure having at least one opening therein comprising the steps of (a) partially immersing the hollow niobium structure in an aqueous electrolytic bath,
(b) orienting said structure so that an interior vapor space is provided in said structure above said bath communicating exteriorly thereof,
(c) inserting an elongated cathode into said structure and disposing it so that gases generated at said cathode will pass directly into said vapor space without contacting the immersed surfaces of said structure,
(d) rotating said structure so that the separate portions of the entire interior surface of the structure are successively immersed in said bath without any of said portions remaining continually therein, and
(e) applying across said anode and said hollow niobium structure an electrical voltage.

2. In the method of claim 1, the rotation of said structure is continuous.

3. In the method of claim 1, the rotation of said structure is intermittent.

4. In the method of claim 1, the axis of rotation of said structure is in the plane of the surface of said electrolyte.

5. In the method of claim 1 when polishing a symmetrical structure, the axis of symmetry of said structure is coincident with said axis of rotation.

6. A method for the anodic oxidation of the interior surface of a hollow niobium structure having at least one opening therein comprising the steps of:

(a) partially immersing the hollow niobium structure in an aqueous ammonia electrolytic bath;
(b) orienting said structure so that an interior vapor space is provided in said structure above said bath communicating exteriorly thereof;
(c) inserting an elongated cathode in said structure disposing it so that gases generated at said cathode will pass directly into said vapor space without contacting the immersed surfaces of said structure;
(d) rotating such structure so that the separate portions of the entire interior surface of the structure are successively immersed in said bath without any of said portions remaining continually therein;
(e) applying an electrical voltage across said cathode and said hollow niobium structure which voltage is increased gradually from 0 to 100 volts DC such that a current density of 2 ma./cm.$^2$ is not exceeded; and
(f) maintaining the final voltage of 100 volts until a current density of approximately 0.2 ma./cm.$^2$ is reached.

7. The method according to claim 6 wherein said voltage is increased in a continuous manner.

8. The method according to claim 6 wherein said voltage is increased in steps.

9. The method according to claim 6 wherein said niobium structure is a small structure.

References Cited

UNITED STATES PATENTS

| 2,861,937 | 11/1958 | Jumer | 204—212 |
| 3,682,799 | 8/1972 | Jumer | 204—129.35 |
| 1,850,426 | 3/1932 | Tyrrell | 204—26 |

THOMAS M. TUFARIELLO, Primary Examiner

U.S. Cl. X.R.

204—218